UNITED STATES PATENT OFFICE 2,221,360

METAL COMPOUNDS OF AZO DYESTUFFS

Max Schmid, Riehen, near Basel, Switzerland, assignor to the firm Society of Chemical Industry in Basle, Basel, Switzerland No Drawing. Application September 27, 1937, Serial No. 166,021. In Switzerland October 3, 1936

17 Claims. (Cl. 260—147)

According to this invention valuable products are obtained by treating with an agent yielding metal, such as a compound of copper, chromium, nickel, iron or cobalt, in substance or on the fibre, an azo-dyestuff which is obtainable by the action of such a diazo-compound of the benzene and naphthalene series which contains in ortho-position to the diazo-group a substituent which is capable of forming stable lakes with the azo-group formed, much as an ortho-hydroxy or ortho-carboxy-diazo compound on a 1-aryl-5-pyrazolone which itself is obtainable by condensation of a β-carbonyl-carboxylic acid ester with a hydrazine of the general formula

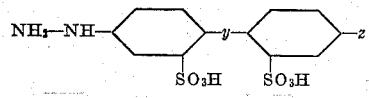

in which $y$ represents a —CH=CH— group or a —CH$_2$—CH$_2$— group and $z$ represents a group which is formed by reduction of a nitro-group in combination with a condensation, such as an azo- or azoxy-group or an amino-group substituted by the residue of an organic acid. The new azo-dyestuffs containing metal thus obtained are distinguished by the high fastness to light of their dyeings and by their excellent affinity for vegetable fibres, such as cotton, flax, ramie, and for fibres of regenerated cellulose, such as artificial silks, for example viscose artificial silk or cuprammonium artificial silk.

Among the ortho-hydroxy and ortho-carboxy-diazo compounds which come into consideration for the preparation of the azo-dyestuffs forming the parent materials of the invention there may be named quite generally those derived from ortho-aminophenols or ortho-aminonaphthols or from ortho-aminocarboxylic acids of the benzene or naphthalene series, for example 1-hydroxy-2-aminobenzene, 1-hydroxy-2-amino- 4 - chlorbenzene, 1-hydroxy-2-amino-4 -nitrobenzene, 1 - hydroxy-2-amino -5- nitrobenzene, 1 - hydroxy - 2 - amino-4:6-dinitrobenzene, 1-hydroxy -2 - amino- 5-nitro-6 - chlorbenzene, 1 - hydroxy - 2 - amino- 4 - methyl - benzene, 1 - hydroxy - 2 - amino - 4- nitro-6-chlorobenzene, 1-hydroxy-2-amino-4-nitrobenzene-6-sulfonic acid, 1-hydroxy-2-amino-6-nitrobenzene- 4 -sulfonic acid, 1 - hydroxy - 2 - aminobenzene-4-sulfamide, 1-hydroxy-2-amino-naphthalene-4:8-disulfonic acid, 2-hydroxy - 1 - aminonaphthalene-4-sulfonic acid, 2-hydroxy-1-amino -6- nitronaphthalene - 4 - sulfonic acid, 1-aminobenzene -2- carboxylic acid, 1 - amino -.4 - chlorbenzene-2-carboxylic acid, 1-amino-4-nitrobenzene-2-carboxylic acid, 1-amino - 4 - benzoyl-amino-2-carboxylic acid, 4-amino-3-carboxylic-azo-benzene-4'-sulfonic acid, aminosulfobenzoic acid (NH$_2$:1, COOH:2, SO$_3$H:4), 2-aminonaphthalene-3-carboxylic acid, and so on.

Among the β-carbonyl-carboxylic acid esters available for preparing the 1-aryl-5-pyrazolones which can be used for the synthesis of the parent dyestuffs there may be named formyl acetic acid esters, furthermore β-keto-carboxylic acid esters, such as ethyl-aceto-acetate, ethyloxal acetate, ethylbenzoylacetate, terephthaloyldiacetic acid ethyl ester, and so on. Among the hydrazines which likewise are used for preparing the 1-aryl-5-pyrazolones used for the synthesis of the parent dyestuffs there may be named such products as:

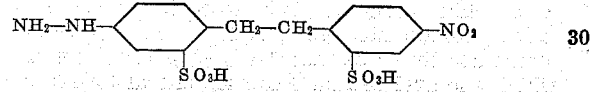

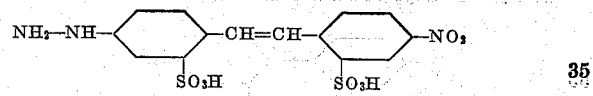

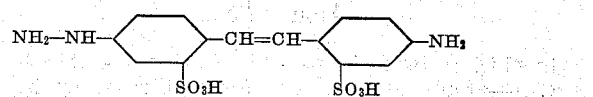

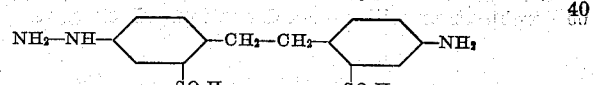

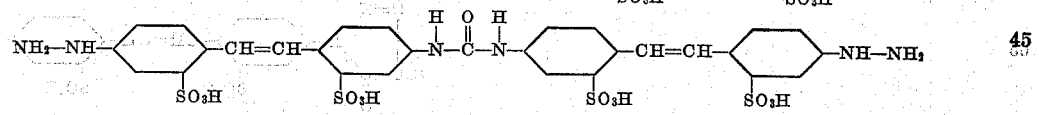

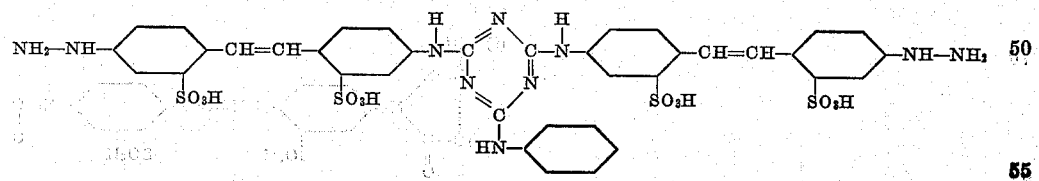

Quite generally, however, it is more advantageous first to combine the nitrohydrazine or the aminohydrazine with one of the aforesaid β-carbonyl-carboxylic acid esters and then to conduct the reduction of the nitro-group in combination with a condensation reaction. This may occur, for example, by cautious reduction by means of grape sugar, the course of the reaction being presumed to consist in the reduction of a part of the product to the amino-group, which then condenses with the unreduced or only partially reduced portions to produce an azo or azoxy compound (compare Formulae 21 and 22 below); (The protection of such dyestuffs is the object of my divisional application Serial No. 263,796 filed March 23, 1939), or the operation may consist in complete reduction of the nitro-group to the $NH_2$-group and subsequent condensation, for example with a halogen compound which converts the $NH_2$-group into a NH—C—b-group in

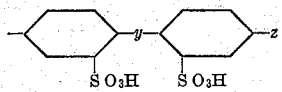

which a stands for metalloid whose atomic weight is not less than 14 and not greater than 16, and b stands for an organic residue of the aliphatic, aromatic, cycloaliphatic, heterocyclic, araliphatic series and so on. Such products constitute acyl derivatives or the amidines which chemically are closely related thereto. As is known, the introduction of such residues into intermediate products or dyestuffs increase the affinity for vegetable fibre. Such residues can be introduced by acylation, for example by treatment with benzoyl chloride, phenylacetyl chloride, cinnamyl chloride, succinyl chloride, butyryl chloride, hexahydrobenzoyl chloride, furane-carboxylic acid chloride, benzimino ether, by treatment with phosgene or thiophosgene or by treatment with heterocyclic products of the nature of amidine halides, such as cyanuric acid chloride, cyanuric acid bromide, tribromopyrimidine, 2:6-dichloro-4-methylpyridine, dichloroquinazoline, and so on. Such dyestuffs containing heterocyclic rings are also the object of my divisional application Serial No. 263,795 filed March 23, 1939.

Particularly valuable products result when the condensation is conducted in such a manner that the residue b is so constituted that it contains an azochromophore or is adapted to couple with diazo compounds to produce azo-dyestuffs. There are thus obtained 1-aryl-5-pyrazolones in which the aryl residue has the general formula:

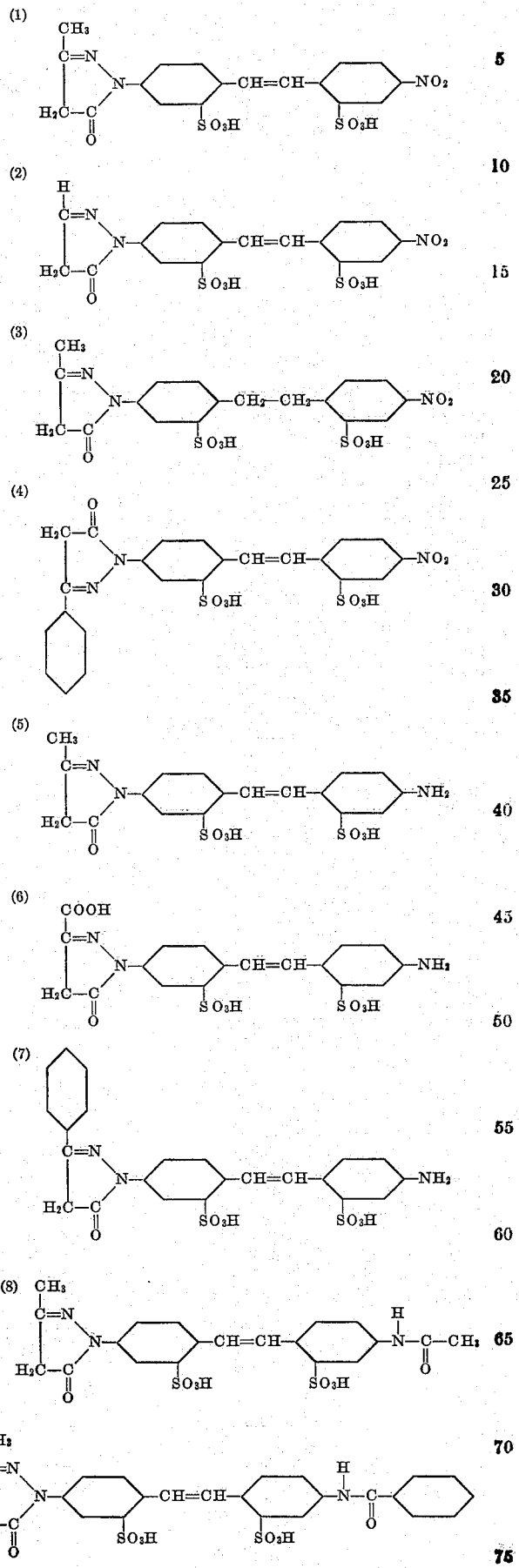

in which y stands for a —CH=CH— or a —$CH_2$—$CH_2$—group and z stands for a nitro-group in combination with a condensation. Such pyrazolone derivatives are, for example:

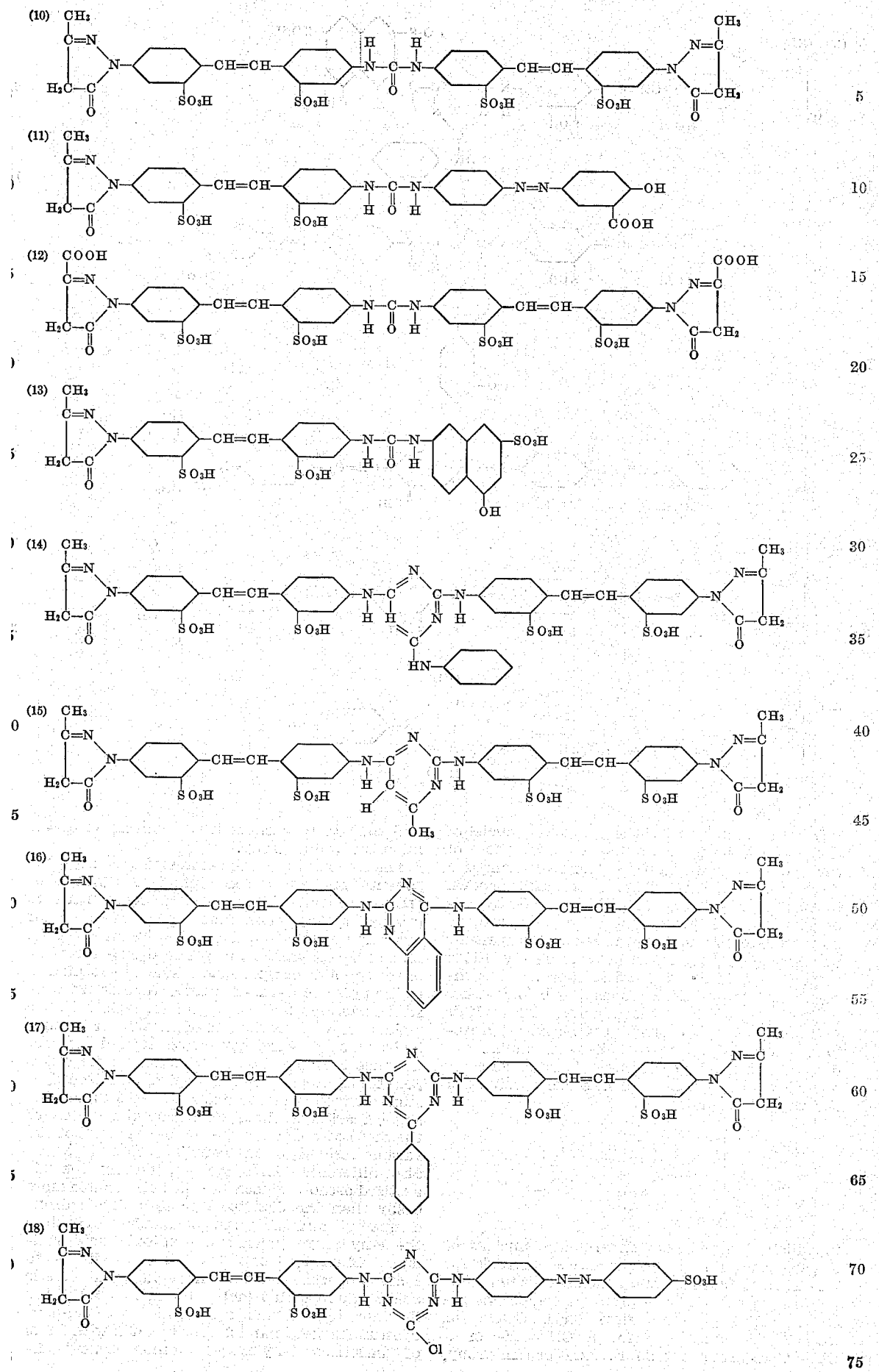

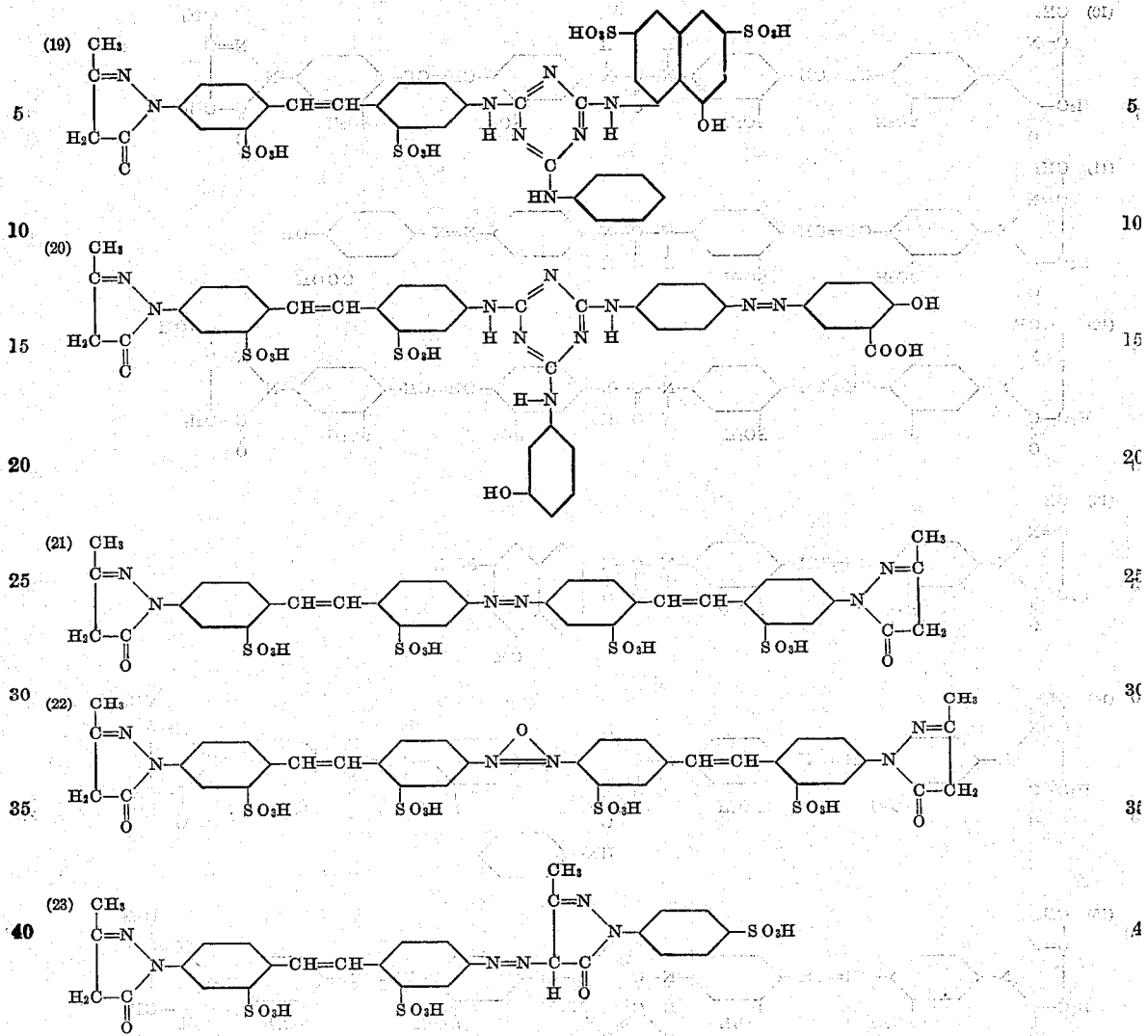

From a comparison of the pyrazolone nuclei of the products of the Formulae 1–7 with those of the products resulting from the reduction of a nitro-group together with a condensation shown in Formulae 5–23, all of which are given by way of example, it is evident how numerous are the intermediate products for making the dyestuffs forming the parent materials for the invention; regard must further be had to the fact that the aryl residue of the pyrazolones may belong either to the stilbene or to the dibenzyl series. It is also possible first to convert the 1-aryl-5-pyrazolones from the aforesaid nitro- or amino-hydrazines by coupling with one of the diazo compounds already referred to into azo-dyestuffs of the general formula:

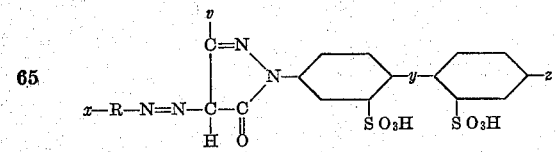

in which R stands for an aromatic nucleus of the benzene or naphthalene series, $x$ stands for an OH- or a COOH-group which stands in ortho-position to the —N=N- group, $v$ stands, for instance, for hydrogen, alkyl, aryl, COOH or COOR' (R'=alkyl), $y$ for a CH=CH- or a CH₂—CH₂- group, and $z$ for a NO₂- or NH₂ group, and then to proceed with the conversion of the nitro- or amino-group.

The combination of the aforesaid coupling components and diazotized ortho-hydroxylated or ortho-carboxylated diazotization components to produce azo-dyestuffs proceeds, as is usual for pyrazolones, in an acid or an alkaline medium. As will be apparent from the foregoing formulae of the coupling components, besides the formation of the pyrazolone-azo-dyestuff a further azo-dyestuff formation may occur, for example with the residue of one of the aminophenol- or amino-hydroxynaphthalene derivatives named (see for instance Formulae 13 and 20). In this case it is possible to prepare as may be desired mixed dyestuffs in respect of the diazotization components, since, apart from the different coupling powers of the diazo components, the coupling powers of the various residues of the coupling components are also different. Thus, quite generally the diazotized ortho-aminocarboxylic acids couple more easily than the diazotized ortho-amino-hydroxy compounds and the pyrazolones more easily than the 1-hydroxynaphthalene-3-sulfonic acid residues. Thus, by combining 1 mol of diazotized 1-aminobenzene-2-carboxylic acid in an acetic acid medium with 1 mol of the compound of the Formula 19, and then combining the mono-azo-dyestuff further in an alkaline medium with 1 mol of diazotized 1-hydroxy-2-aminobenzene-4-sulfonic acid, there is produced a dyestuff of the formula:

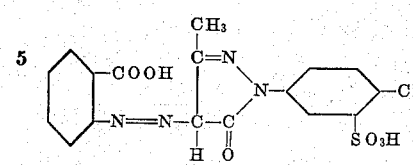 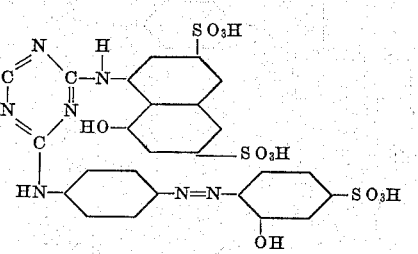

Such mixed dyestuffs, but containing metal, may also be prepared easily by the use of diazotization components which only during metallisation pass into ortho-hydroxy- or ortho-carboxy- azo derivatives.

The conversion of the azo-dyestuffs into metal compounds may as a rule be conducted by treatment of the finished dyestuff with a salt, hydroxide or oxide of one of the metals hereinbefore referred to, for example copper sulfate, copper chloride, copper hydroxide, ammoniacal copper oxide, copper tetramine sulfate, derivatives of copper tetramine sulfate in which the ammonia residues are replaced by the residues of organic bases, such as methylamine or pyridine, chromium chloride, chromium sulfate, chromium fluoride, chromium formate, chromium acetate, chromium hydroxide, sodium chromite, sodium glycerine chromite, nickel chloride, nickel sulfate, cobalt chloride, manganese chloride, and so on. The metallization may be conducted on the fibre or advantageously in substance by treating or warming a solution or suspension of the dyestuff in admixture with one of the aforesaid salts in an open vessel or under pressure. The same metalliferous dyestuffs can also be obtained by metallizing dyestuffs which have been prepared from the 1-aryl-5-pyrazolones here in question and from diazotization components which contain no OH- or COOH-group in ortho-position but contain in ortho-position a substituent which in the course of the metallization becomes converted into an OH- or COOH-group, such as a chlorine or bromine atom or an OCH3-group (which substituents are converted into the OH-group during metallization) or a COO-alkyl-group which is then saponified to a COOH-group. The metallization can also occur simultaneously with the coupling of the azo-dyestuff; this procedure is particularly to be recommended in the production of copper compounds.

The new dyestuffs, therefore, are complex metal compounds of dyestuffs such as the following:

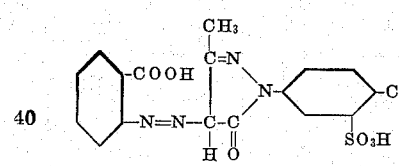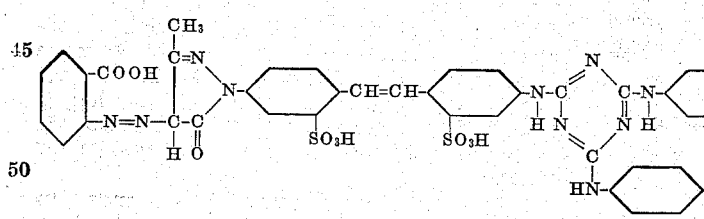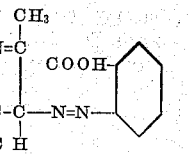

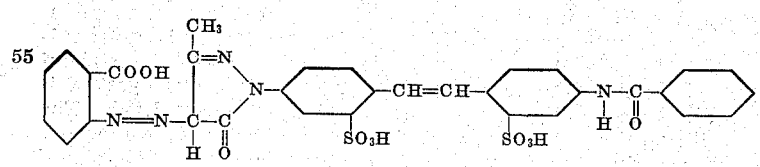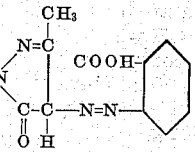

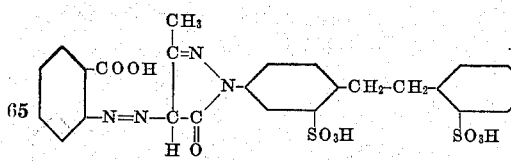

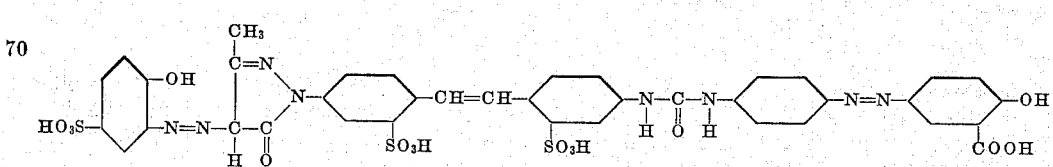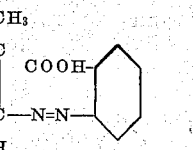

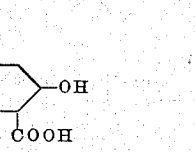

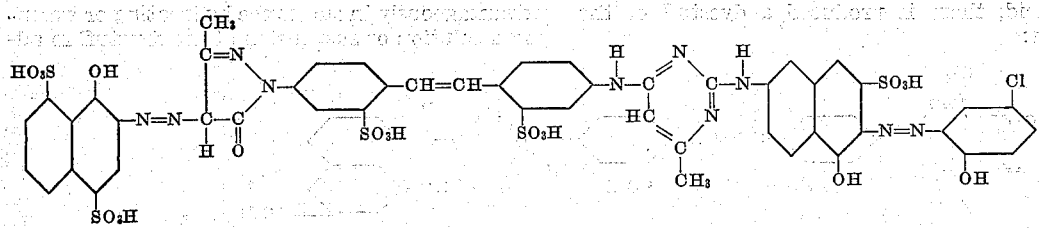

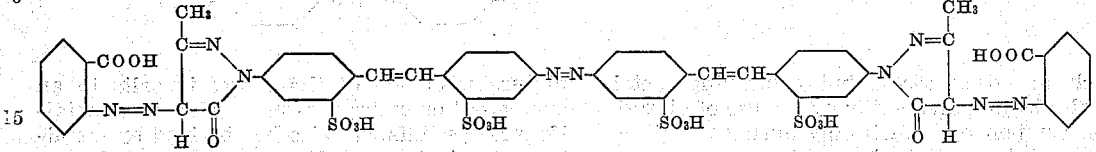

it being unknown in what manner the metal is bound at the ortho-hydroxy or ortho-carboxy-azo-group; reference must also be made to the further possibilities afforded by the diazo components hereinbefore mentioned and the formulae of the coupling components given by way of example.

The dyestuffs of the present invention are accordingly complex metal compounds of azo-dyestuffs of the general formula

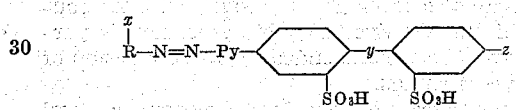

in which $x$ stands for a substituent in ortho-position to the N=N-group which is capable of forming complex compounds with metals, Py stands for the residue of a 5-pyrazolone which is combined in 1-position with the residue

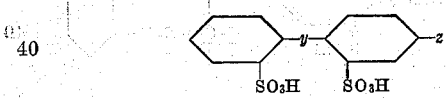

and in 4-position with the azo-residue, $y$ for a CH=CH- or a CH$_2$—CH$_2$-group and $z$ for the conversion product of a nitro-group.

The characteristic properties of the new metalliferous dyestuffs are conditioned by the grouping

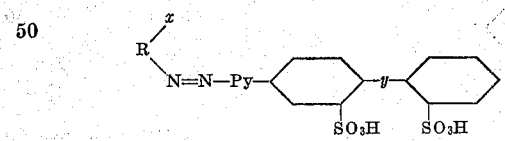

which in particular is responsible for the shade of the dyestuffs, their high fastness to light and their affinity for vegetable fibres, as will be evident from a comparison of the properties of the individual products described in the examples which follow.

When prepared in substance the new products

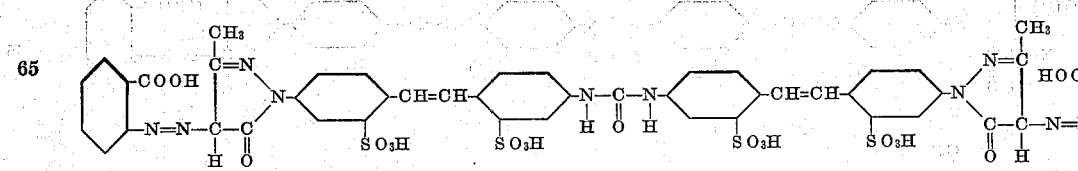

constitute in the dry state yellow to brown or blackish powders which are soluble in water to yellow to orange, brown, greenish, olive and blackish solutions from which they are adsorbed by cellulose fibres yielding dyeings of similar shades which are distinguished by their excellent properties hereinbefore referred to. Details in respect of the manufacture of such dyestuffs and of their properties will be found in the following examples, the number of which could be multiplied as desired. The parts in the examples are by weight. In all the examples, the formulae given represent the products in their free states.

*Example 1*

13.7 parts of 1-aminobenzene-2-carboxylic acid are diazotized in the usual manner and coupled in an acetic acid medium with 45.1 parts of the 3-methyl-5-pyrazolone of the formula

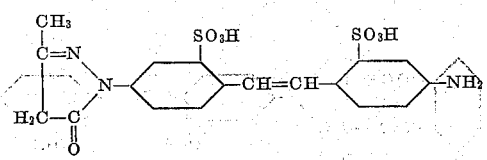

The dyestuff is isolated, dissolved in 1000 parts of water, containing an excess of sodium carbonate, and the solution is treated with phosgene at 40–50° C. When this treatment is ended, that is to say when a free amino-group is no longer present, the dyestuff is isolated and dried. It is a yellow powder which dyes cotton fast yellow shades.

The dyestuff thus prepared is suspended in 3000 parts of water and the suspension is mixed with an ammoniacal copper oxide solution corresponding with 35 parts of crystallized copper sulfate. The whole is stirred at 60–70° C. of about 1 hour, whereupon the metalliferous dyestuff is filtered with suction and cautiously dried. The dry dyestuff containing copper is a brown powder which dyes vegetable fibres and artificial silks of regenerated cellulose excellent yellow shades fast to light. The non-metallized dyestuff corresponds thus to the formula The conversion of the dyestuff into its copper complex may also be conducted in an acid medium by treatment with a copper salt such as copper sulfate.

By combining the diazo compound from 13.7 parts of 1-amino-benzene-2-carboxylic acid with 45.3 parts of the 3-methyl-5-pyrazolone of the formula

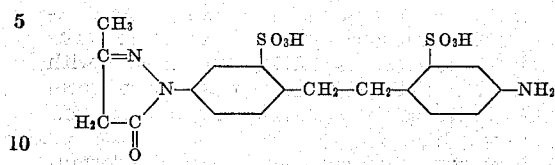

treating the dyestuff with phosgene and converting the product into the complex copper compound as above described there is obtained a dyestuff containing copper which, when dried, constitutes a yellow-brown powder and dyes cotton fast yellow shades, resembling in shade and properties those of the stilbene product.

By suspending 59.9 parts of the dyestuff described in the first paragraph of this example in about 3000 parts of water and treating the suspension with a solution of 30 parts of crystallized nickel sulfate in 200 parts of water for 1 hour at 70–80° C. in the presence of sodium acetate there is obtained the complex nickel compound of the dyestuff which, when dried, is a brownish powder which dyes cotton fast yellow shades with a somewhat orange hue.

The same shades are obtained by first dyeing with the non-metallized dyestuff in the manner usual for dyeing with direct dyestuffs and then after-coppering or after-treating the dyeing with a nickel salt. By treating with an iron salt a dyeing prepared with an alkali salt of the dyestuff there is obtained a dull yellow shade, by treatment with a cobalt salt a yellow shade, with a chromium salt a somewhat greenish-yellow shade and with a manganese salt a yellow shade.

*Example 2*

45 parts of the 3-methyl-5-pyrazolone of the formula

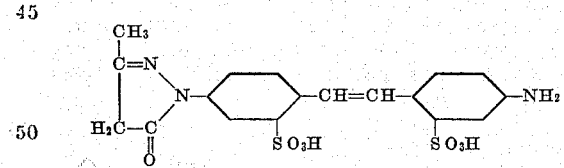

or of the formula

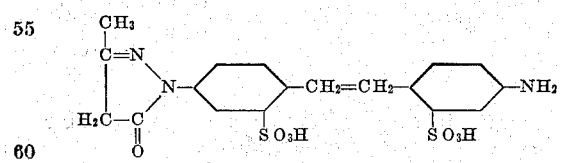

are dissolved in 500 parts of water and 11 parts

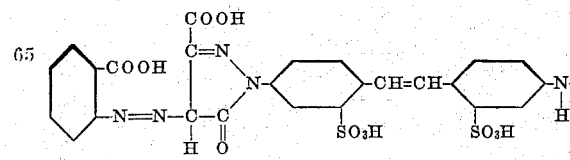

of sodium carbonate and converted into the corresponding urea by the introduction of phosgene at a temperature of 40–50° C. When the free amino-group has disappeared the urea is isolated. 46.2 parts of the urea thus obtained are dissolved in water together with the quantity of sodium carbonate necessary for forming the sodium salt, 13.6 parts of sodium acetate are added and the solution is coupled in the usual manner with a solution of the diazo compound from 13.7 parts of 1-aminobenzene-2-carboxylic acid in the presence of 25 parts of copper acetate. When the diazo compound has disappeared the whole is made alkaline with ammonia, gently heated and filtered after the addition of common salt. The cupriferous dyestuff thus obtained shows the same behavior as the cupriferous dyestuff described in the preceding example. The replacement of phosgene by thiophosgene leads to a similar product. So also does the replacement of the 1-aminobenzene-2-carboxylic acid by the 1-amino-4-chlorobenzene-2-carboxylic acid, by 1-amino-4-nitrobenzene-2-carboxylic acid, by 1-amino-4-methylbenzene-2-carboxylic acid or by 1-amino-4-ethoxy-benzene-2-carboxylic acid.

If there is used as parent material for making the metalliferous dyestuff the 3-carboxy-5-pyrazolone of the formula

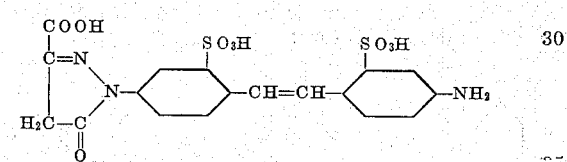

obtainable by condensation of the corresponding hydrazine with oxalacetic ester or its sodium compound and saponification of the carboxylic ester group, or the 3-phenyl-5-pyrazolone of the formula

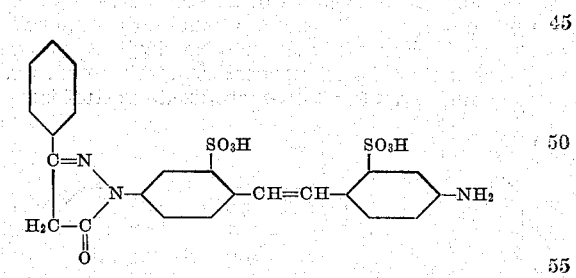

(obtainable from benzoylacetic ester), dyestuffs having similar valuable properites are obtained. The formula of a non-metallized dyestuff of this group is for instance

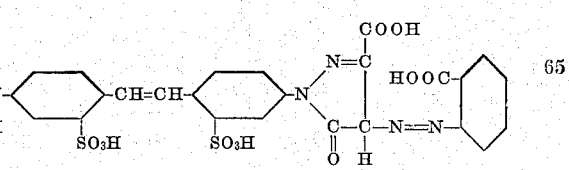

Quite similar dyestuffs are obtained if the CO-group of the urea residue is replaced by a heterocyclic amidine-like nucleus. Such a product can be obtained, for example, by adding 90.2 parts of the 3-methyl-5-pyrazolone named in the first paragraph of this example to a fine aqueous suspension of 18.4 parts of cyanuric chloride, care being taken to keep the reaction mass just neutral by the addition of a sodium carbonate solution. When no more sodium carbonate is consumed the secondary condensation product from 2 mols of the pyrazolone and 1 mol of cyanuric chloride has been formed. If required, this secondary product can be converted into a tertiary condensation product by replacing the remaining chlorine atom in the cyanuric ring by treatment with 9.3 parts of After some time 11.6 parts of sodium carbonate are added to the suspension of the mono-azo-dyestuff. The mono-azo-dyestuff thereupon dissolves and is then further coupled with a diazo solution prepared as usual from 18.9 parts of 1-hydroxy-2-aminobenzene-4-sulfonic acid. The dyestuff is isolated by salting-out, filtered with suction and dried. When dry it is a dark brown powder which dyes cotton and similar fibres yellow-brown shades.

The dyestuff thus obtained having the formula

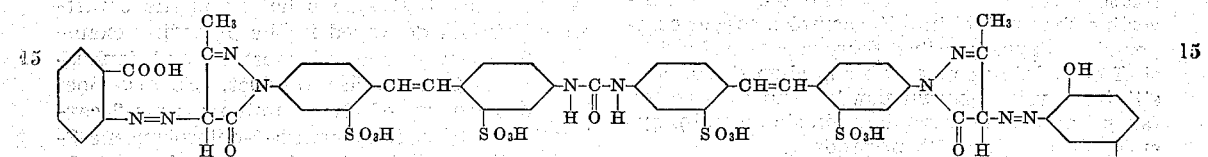

aniline in known manner. If now the sodium salt from 53.5 parts of this condensation product is combined with the diazo compound from 13.7 parts of 1-aminobenzene-2-carboxylic acid there is obtained a dyestuff whose metal compounds resemble the metal compounds of the azodyestuff of Example 1: for instance, the copper compound dyes cotton yellow shades very fast to light. The formula of the non-metallized dyestuff is therefore:

is suspended in the required quantity of water, the suspension is heated to 68–70° C. and there is added an ammoniacal copper oxide solution corresponding with 50 parts of crystallized copper sulfate. The complex copper compound of the dyestuff precipitates. The whole is further stirred for about one hour and is then allowed to cool and filtered with suction, if required after completely salting-out the cupriferous dyestuff. When dry, the dyestuff is a brown powder which

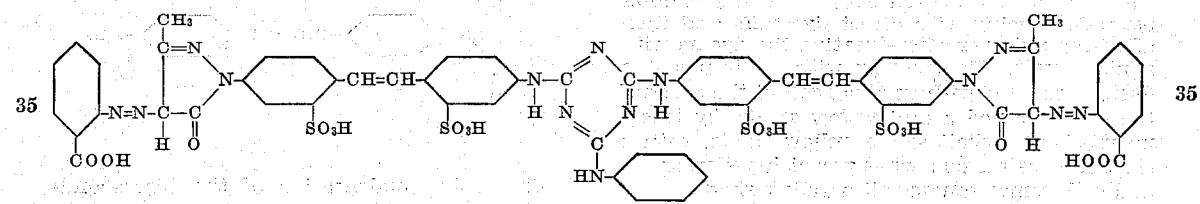

If in the preparation of such dyestuffs or of the condensation products from animo-aryl-pyrazolone and cyanuric chloride from which they are derived the 18.4 parts of cyanuric chloride are replaced by 11.5 parts of 2:6-dichloro-4-methyl-pyrimidine or 19.9 parts of dichloro-quinazoline or 21.4 parts of phenylchlorotriazine, dyestuffs having very similar properties are obtained. The formula of such a non-metallized dyestuff is:

is soluble in water to a brown-yellow solution and dyes cotton and artificial silk from regenerated cellulose brown-yellow shades which are very fast to light.

By treating the dyestuff of the above formula with agents yielding other metals than copper, such as salts of manganese, iron, cobalt, nickel, chromium and so on, there are obtained the cor-

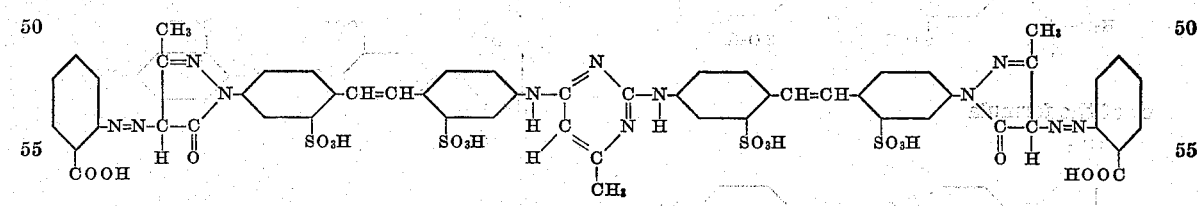

Example 3

92.8 parts of the 3-methyl-5-pyrazolone of the formula responding metal complexes which dye vegetable fibres similar yellow-brown shades.

The metal complexes may also be produced by

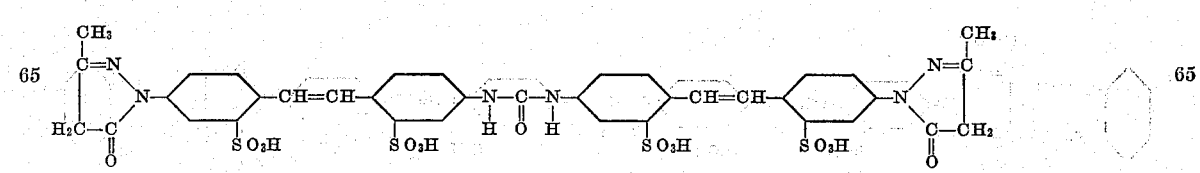

in the form of the neutral sodium salt are dissolved in water together with the necessary quantity of sodium carbonate, and after addition of 13.6 parts of crystallized sodium acetate the solution is coupled with the diazo compound from 13.7 parts of 1-aminobenzene-2-carboxylic acid.

an after-treatment on the fibre in the manner illustrated in Example 1.

If in the present example the 1-aminobenzene-2-carboxylic acid is replaced by a substituted anthranilic acid such as 1-amino-4-chlorobenzene-2-carboxylic acid or 1-amino-4-nitrobenze-3-carboxylic acid and the ortho-aminophenol is replaced by one of its substitution products, such as 4-chloro-2-amino-1-hydroxybenzene or 4- or 5-nitro-2-amino-1-hydroxybenzene, or by one of the other ortho-hydroxyamino compounds of the benzene or naphthalene series named in the introduction, dyestuffs are obtained which can likewise be converted according to the foregoing directions into complex copper or other metal compounds. In this connection the following may be said.

Whilst replacement of the 1-aminobenzene-2-carboxylic acid by the aforesaid substitution products of this body influences the shade of the final dyestuff only to a small extent, substantial displacements of the shade can be obtained by suitable selection of the ortho-hydroxy-diazo compound, whereby, for instance, products which dye orange to brown-yellow and reddish shades can be prepared. Thus for example, the copper compound of the product from 1 mol of the pyrazolone-urea derivative of the first paragraph of this example with 1 mol of diazotized 1-aminobenzene-2-carboxylic acid and 1 mol of diazotized 5-nitro-2-amino-1-hydroxybenzene dyes brown-yellow shades; replacement of the 5-nitro-2-amino-1-hydroxybenzene derivative by diazotized 1-amino-2-hydroxynaphthalene-4-sulfonic acid leads to a copper compound which dyes reddish-brown shades.

If in this example the 3-methyl-5-pyrazolone is replaced by the corresponding 5-pyrazolone-3-carboxylic acid there are obtained analogous dyestuffs which, especially in the case of the copper compounds, dye vegetable fibres shades which are extremely fast to light. Furthermore, the derivatives of the other 1-aryl-5-pyrazolones referred to in Example 2 lead to similar products.

If in the preparation of the dyestuffs from the urea pyrazolone derivatives of the present example the 1-aminobenzene-2-carboxylic acid is also replaced by an ortho-aminophenol, metalliferous dyestuffs dyeing darker shades are obtained. Thus, the copper compound of the dyestuff of the formula

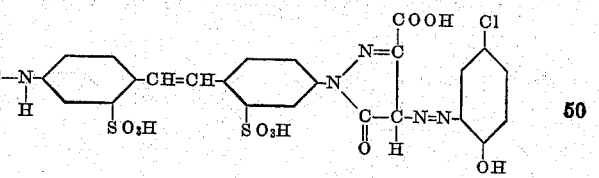

dyes cotton brown-red.

Example 4

59.9 parts of the dyestuff from diazontized 1-aminobenzene-2-carboxylic acid and the 3-methyl-5-pyrazolone of the formula

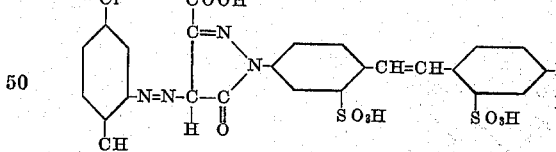

in the form of the neutral sodium salt are dissolved in about 1000 parts of water, and at about 5° C. 16 parts of benzoyl chloride are slowly added to the solution whilst continuously stirring and neutralizing the liberated acid by addition of sodium carbonate. When the condensation is finished, the dyestuff is precipitated in the usual manner.

It is then suspended in water and converted into a complex copper compound by treatment with an agent yielding copper, for instance in the manner indicated in Example 1. When dry, the cupriferous dyestuff is a brown-yellow powder which dyes vegetable fibres yellow shades. The formula of the non-metallized dyestuff is:

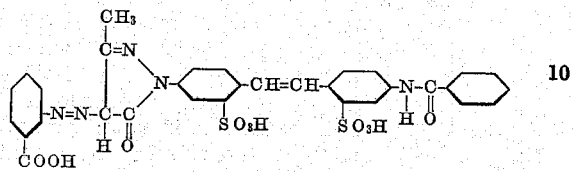

The cupriferous dyestuff can also be produced on the fibre. If the dyestuff obtainable as described in the first paragraph of this example is treated with agents yielding metals other than copper, for example with a salt of nickel, cobalt, manganese, chromium or iron, there are obtained the corresponding complex metal compounds which dye the fibre yellow shades or shades which vary more or less from yellow.

The same products can also be prepared by first treating the 5-pyrazolone serving as parent material with the acidylating agent and then combining the acidylated pyrazolone with the diazo compound and converting the product into the complex metal compound; alternatively, the complex metal compound of the dyestuff referred to at the commencement of this example may be treated with the acidylating agent.

As acidylating agents there may be used in the appropriate manner the anhydrides or acid halides of carboxylic or sulfonic acids, for example of acetic acid, butyric acid, substituted benzoic acids such as pari-nitrobenzoic acid, cinnamic acid, benzenedicarboxylic acids such as, among others, terephthalic acid, hexahydro-benzoic acid, oxalic acid, phenylacetic acid, furane-carboxylic acid, benzenesulfonic acids, substituted benzenesulfonic acids such as para-toluenesulfonic acid, and many others.

Further valuable similarly constituted dyestuffs are obtained if the initial dyestuff of the first paragraph of this example is condensed with benzimino ether and then treated with agents yielding metal, for example agents yielding copper. The non-metallized dyestuff corresponds in this case with the formula

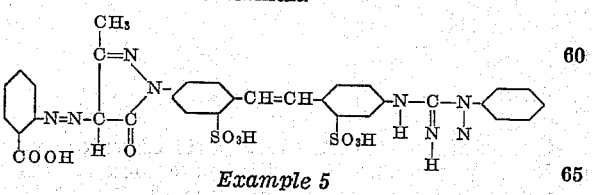

Example 5

59.9 parts of the dyestuff from diazotized 1-aminobenzene-2-carboxylic acid and the 3-methyl-5-pyrazolone of the formula

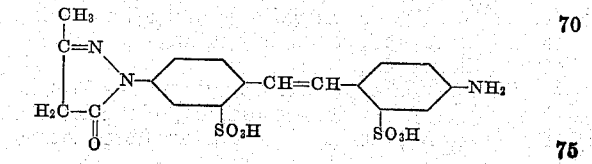

in the form of the neutral sodium salt are dissolved in about 300 parts of water, and at 0–5° C. the solution is introduced into an aqueous suspension of 18.4 parts of cyanuric chloride. When condensation is finished there is introduced into the mixture a solution of the sodium compound from 25.7 parts of 4-amino-4'-hydroxy-azobenzene-3'-carboxylic acid in about 100 parts of water. The whole is heated at 50–55° C. and the liberated acid is neutralized by the addition of sodium bicarbonate. When condensation is finished the reaction product is salted out and filtered with suction. The dyestuff of the formula

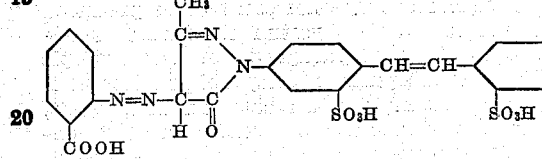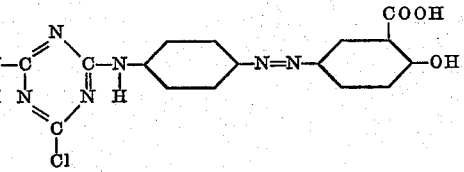

can be converted as such into a metal compound; the copper compound dyes cotton or viscose artificial silk, for example, fast yellow shades.

The third chlorine atom of the cyanuric ring may also be exchanged. For this purpose the freshly filtered non-metallized dyestuff is dissolved in about 800 parts of water and the solution is boiled for about 1 hour with 9.3 parts of aniline for replacing the remaining chlorine atom of the cyanuric residue. The excess of aniline is then expelled by steam distillation, the solution is filtered and the dyestuff is salted-out, filtered with suction and dried. The dyestuff so obtained dyes cotton powerful yellow shades.

This dyestuff having presumably the formula

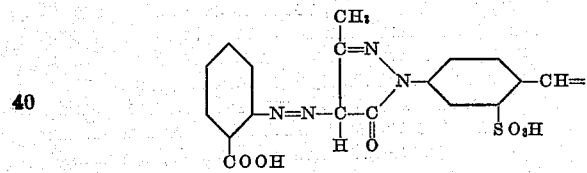

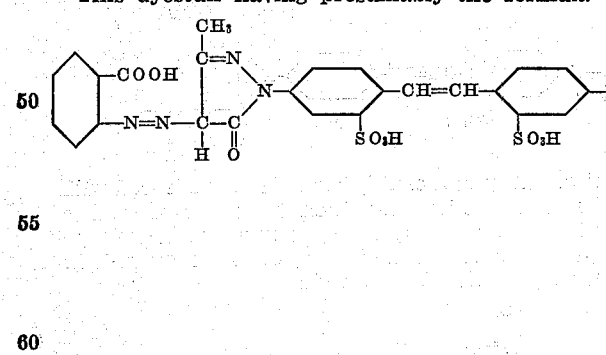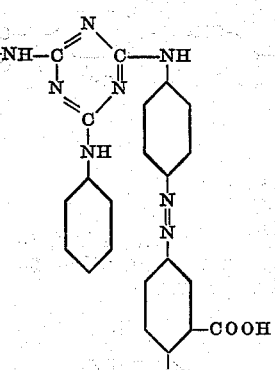

is suspended in about 3000 parts of water and the suspension is mixed with an ammoniacal copper oxide solution corresponding with 50 parts of crystallized copper sulfate. The whole is heated at 60–70° C. and stirred for about 1 hour at this temperature. The sparingly soluble complex copper compound precipitates and after cooling and, if necessary, completely salting-out, it is filtered with suction.

When dry, the cupriferous dyestuff is a brownish powder which dyes cotton, artificial silk from regenerated cellulose and similar fibres stable pure yellow shades of excellent fastness to light.

The analogous dyestuff in which the CH=CH-group is merely replaced by a $CH_2$—$CH_2$-group has similar properties. If the dyestuff of the first paragraph of this example is suspended in about 3000 parts of water and the suspension is heated with a solution of 30 parts of crystallized nickel sulfate in 200 parts of water in the presence of sodium acetate for one hour at 70–80° C., there is obtained a complex nickel compound which, when dry, is a brownish powder and dyes cotton fast yellow tints.

Like shades are obtained by first dyeing the fibre with the non-metallized dyestuff in the manner usual for direct dyestuffs and then after-coppering the dyeing or after-treating it with a nickel salt in known manner. By treating with an iron salt a dyeing produced by means of an alkali salt of the dyestuff there are obtained dull yellow shades; by treatment with cobalt salts yellow shades, with chromium salts somewhat greenish-yellow shades and with manganese salts yellow shades are obtained. Those complex metal salts may also be prepared in substance by known methods.

By metallizing according to the data of the preceding paragraphs the similarly constituted dyestuff of the formula which is obtained as chief product if phosgene is run into a solution of 60 parts of the azo-dyestuff of the formula

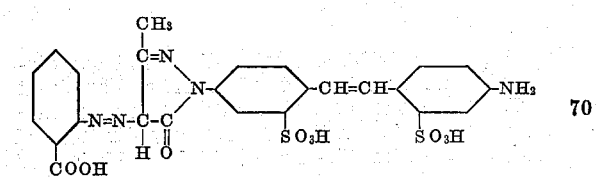

and 26 parts of 4-amino-4'-hydroxyazobenzene-3'-carboxylic acid in 400 parts of water containing 30 parts of sodium carbonate until almost no free amino-group is present, there are obtained dyestuffs whose tints are very similar to the corresponding metallized dyestuffs containing the cyanuric ring.

The replacement of 1-aminobenzene-2-carboxylic acid by an ortho-aminophenol or an ortho-aminonaphthol in the synthesis of such dyestuffs leads to copper compounds which dye brown shades. This is the case, for example, with the dyestuffs of the general formulae

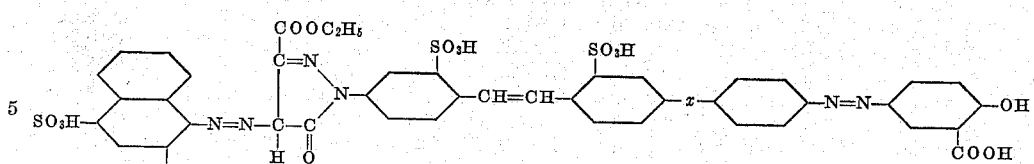

and

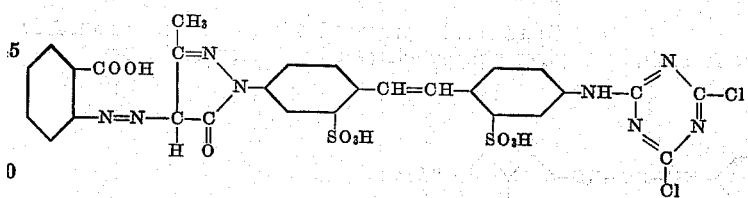

in which $x$ stands for instance, for

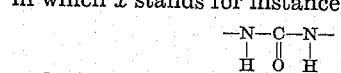

and

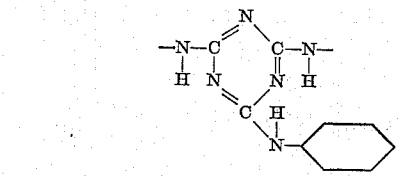

Finally, if in the first phase of this example the primary condensation product of the formula

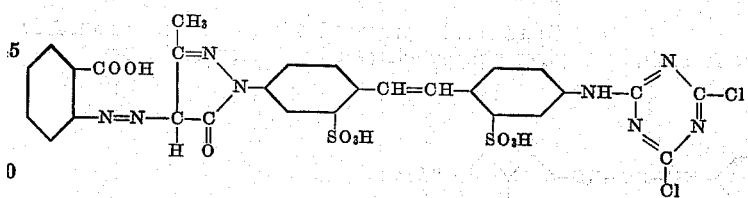

is condensed with 2 equivalent proportions of 4-amino-4'-hydroxy-azobenzene-3'-carboxylic acid and the tertiary condensation product is treated with an agent yielding metal, there are again obtained metalliferous dyestuffs which dye yellow shades.

Example 6

The primary condensation product prepared according to the first paragraph of Example 5 from 1 equivalent proportion of the dyestuff from diazotized 1-aminobenzene-2-carboxylic acid and the 1-aryl-5-pyrazolone of the formula

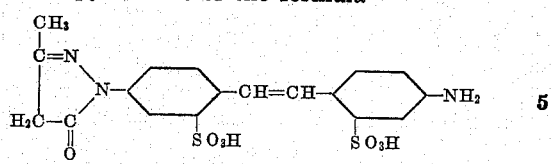

and one equivalent proportion of cyanuric chloride is condensed in an analogous manner with 27.7 parts of 4-amino-azobenzene-4'-sulfonic acid and 9.3 parts of aniline or 10.7 parts of monomethyl-aniline or para-toluidine. There is obtained a yellow dyestuff which dyes cotton fast shades and can be converted into a complex copper compound in the manner already described. The replacement of the 4-amino-azobenzene-4'-sulfonic acid by the azo-dyestuff from diazotized 2-amino-naphthalene-4:8-disulfonic acid and meta-toluidine followed by diazotization and coupling with a further molecule of meta-toluidine leads to a product which when converted into the copper compound constitutes a browner dyestuff,

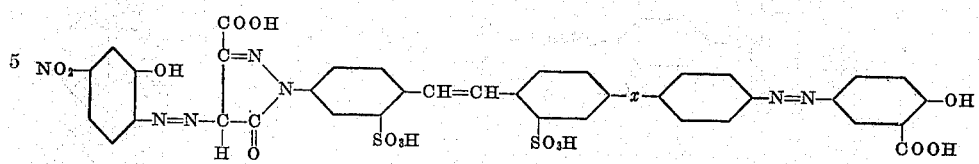

which corresponds for example to the following formula of a non-metallized dyestuff:

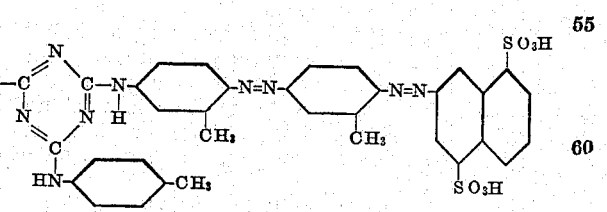

Example 7

45.1 parts of the 3-methyl-5-pyrazolone of the formula

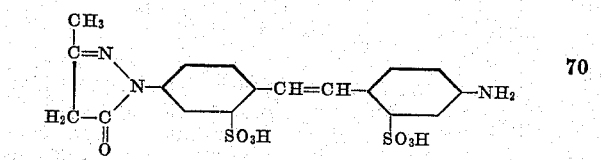

are dissolved in 500 parts of water together with the quantity of sodium carbonate required for forming the disodium salt and to the solution is added a solution of the sodium salt from 23.9 parts of 2-amino-5-hydroxynaphthalene-7-sulfonic acid. The mixture is heated to 40–50° C. and converted into the mixed urea by the introduction of phosgene.

71.6 parts of the urea thus prepared are dissolved in the form of the sodium salt in 300 parts

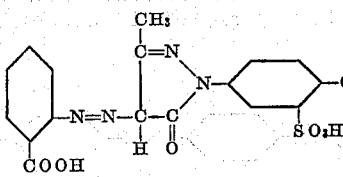

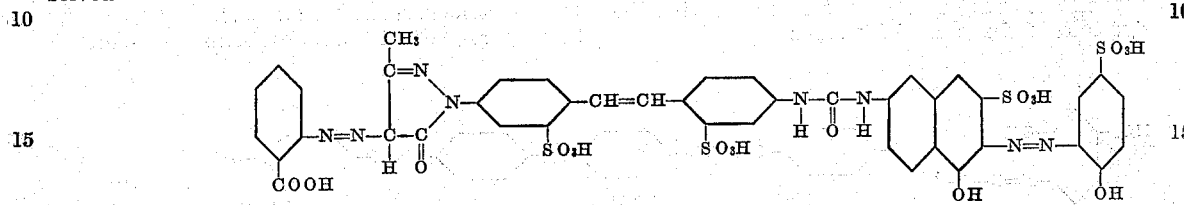

of water, 13.6 parts of sodium acetate are added and the solution is coupled with a diazo solution from 13.7 parts of 1-aminobenzene-2-carboxylic acid. Then there are added an aqueous solution of 11 parts of sodium carbonate and a diazo solution from further 13.7 parts of 1-aminobenzene-2-carboxylic acid. When coupling is finished, the dyestuff is salted out, filtered with suction and dried. It is a yellow-brown powder which dyes cotton yellow-brown shades. By converting the dyestuff into a copper or nickel compound according to the directions in Example 1, dyestuffs are obtained which dye cotton yellow-brown shades of excellent fastness to light. The non-metallized dyestuff corresponds to the formula finished, the dyestuff is isolated as usual. By treating it with agents yielding metal according to the directions of Example 1, for example with a salt of copper or nickel, metalliferous dyestuffs are obtained which dye vegetable fibres fast shades which are yellow-brown in the case of the copper compound and orange-brown in the case of the nickel compound. The non-metallized dyestuff corresponds to the formula If the 3-methyl-5-pyrazolone of the stilbene series used as parent material in the first paragraph of this example is replaced by a corresponding 3-aryl-pyrazolone or 3-carboxy-pyrazolone or by corresponding 5-pyrazolones of the dibenzyl series, or if, furthermore, the 2-amino-5-hydroxynaphthalene-7-sulfonic acid used for the urea formation is replaced by another amino-naphthol, for example 2-amino-8-hydroxynaphthalene-6-sulfonic acid or 1-amino-8-hydroxynaphthalene-3:6-disulfonic acid, and having regard to the substituted ortho-carboxylated or ortho-hydroxylated diazo compounds of the benzene and naphthalene series already specified in the introduction and in the examples,

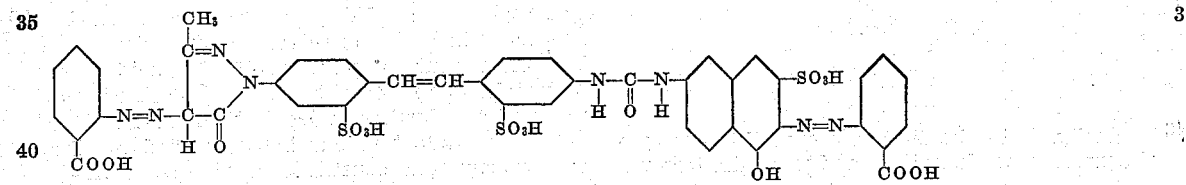

Example 8

71.6 parts of the mixed urea of the formula

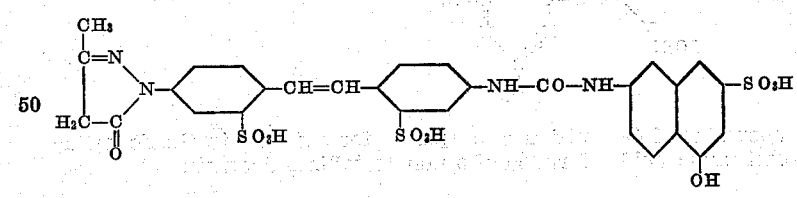

obtainable as described in the first paragraph of Example 7 are dissolved in the form of the sodium salt in about 300 parts of water, and after addition of sodium acetate the solution is combined with a diazo solution from 13.7 parts of 1-aminobenzene-2-carboxylic acid. When formation of there can be prepared a large number of further dyestuffs which can be converted by treatment with agents yielding metal, such as agents yielding copper, according to the directions given in Example 1, into very valuable dyestuffs containing metal which dye textile fibres various shades of brown. Brown dyestuffs, for example, are the copper compounds of such azo-dyestuff as

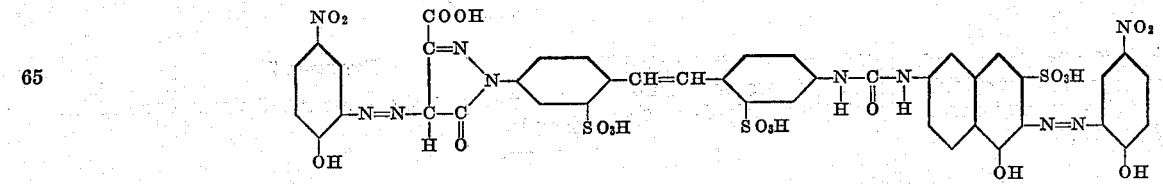

the mono-azo-dyestuff is finished, there are added an aqueous solution of 11 parts of sodium carbonate and then slowly a diazo solution from 18.9 parts of 2-amino-1-hydroxybenzene-4-sulfonic acid. When coupling to a disazo dyestuff is The possibility of preparing numerous different dyestuffs is still further extended, since it is proved that, according to the sequence in which the various diazo compounds are used, there are obtained, even from otherwise the same parent materials, dyestuffs or metal compounds which indeed have similar dyeing properties but nevertheless exhibit appreciable variations.

with 9.3 parts of aniline or with 10.7 parts of meta-toluidine. After the excess of primary amine has been expelled by steam distillation, the finished condensation product is salted out with common salt, filtered with suction and dried.

42.5 parts of a ternary condensation product thus obtained having the formula

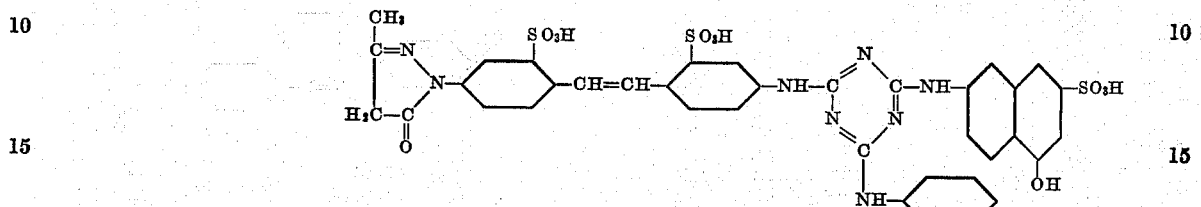

or of the formula

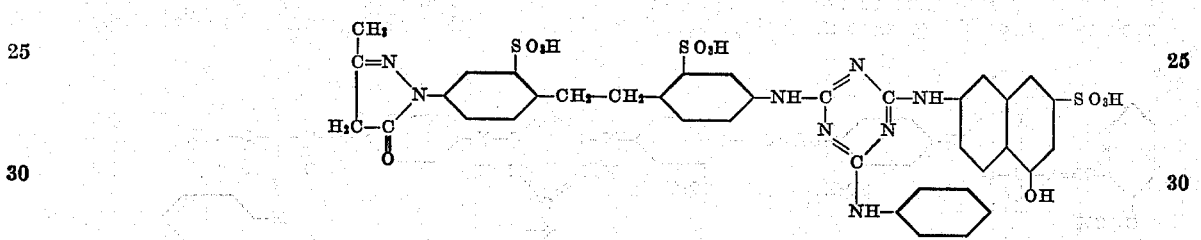

Example 9

45.1 parts of the 3-methyl-5-pyrazolone of the formula

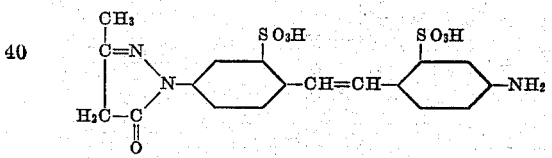

or of the formula

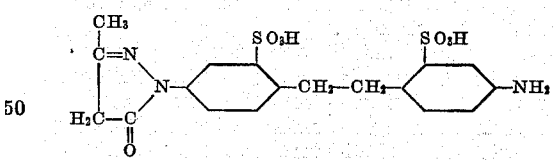

in the form of the neutral sodium salt are condensed in known manner with 48.4 parts of cyanuric chloride and the primary condensation product is combined with a solution containing 23.9 parts of 2-amino-5-hydroxynaphthalene-7-sulfonic acid in the form of the sodium salt at 40–50° C. whilst neutralizing the acid liberated in the condensation by means of sodium carbonate. For exchanging the remaining chlorine atom of the cyanuric ring the secondary condensation product is treated in known manner are dissolved in 200 parts of water with addition of sodium carbonate in the quantity required for forming the neutral sodium salt and the solution is then mixed with the diazo solution from 13.7 parts of 1-amino-benzene-2-carboxylic acid with the addition of a solution of 25 parts of copper sulfate in dilute ammonia. There is thus formed the copper compound of the disazo-dyestuff which, when isolated in known manner, dyes cotton fast brown shades. If in the preparation of the intermediate product for this dyestuff according to the first paragraph of this example the 23.9 parts of 2-amino-5-hydroxynaphthalene-7-sulfonic acid are replaced by a like quantity of 2-amino-8-hydroxynaphthalene-6-sulfonic acid there is obtained a dyestuff containing copper and dyeing similar shades, whilst replacement of the 2-amino-5-hydroxynaphthalene-7-sulfonic acid by 31.9 parts of 1-amino-8-hydroxynaphthalene-3:6-disulfonic acid leads to a product containing copper which dyes appreciably deeper and redder shades. The formula of the non-metallized dyestuff corresponding to the last named product is the following:

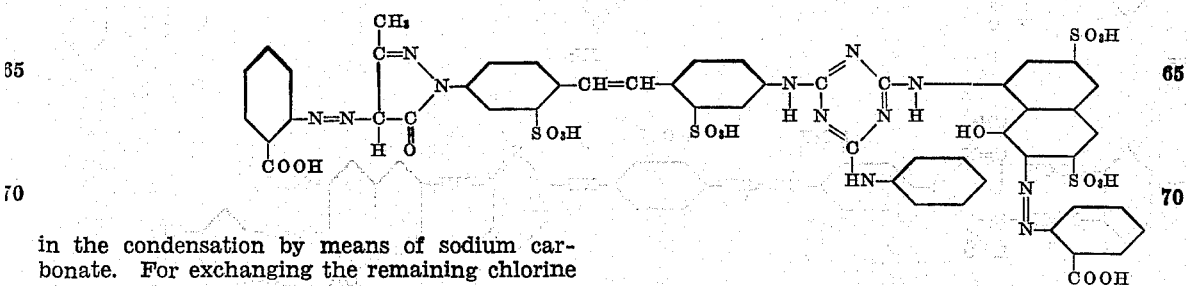

Deep brown is for example the copper compound of the azo-dyestuff of the formula

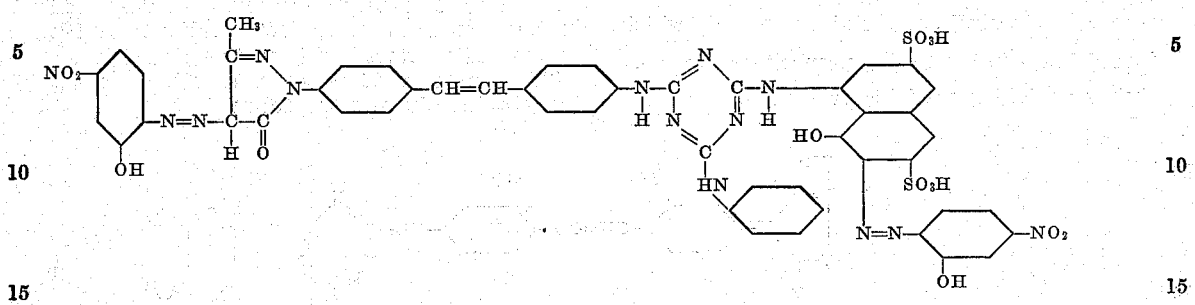

is separated by filtering. The product dyes cotton yellow-brown shades.

Complex metal compounds which dye yellow shades can be obtained by replacing in the preparation of the intermediate product the 2-amino-5-hydroxynaphthalene-7-sulfonic acid by 1-amino-3-hydroxynaphthalene, 1 - (4' - aminophenyl)-3-methyl - 5 - pyrazolone, 1-(3'-aminophenyl)-3-carboxy - 5 - pyrazolone, para-aminoaceto-acetic anilide and so on. The formula of such a non-metallized dyestuff is for example:

A yellowish-brown dyestuff is likewise obtained by combining 42.9 parts of the condensation product of the first paragraph of this example with the diazo compound from 22.3 parts of 2-amino-4-chloro - 1 - hydroxybenzene-6-sulfonic acid and converting the dyestuff thus obtained into its copper compound.

Further brown dyestuffs are obtained by combining 1 mol of the aforesaid ternary condensa-

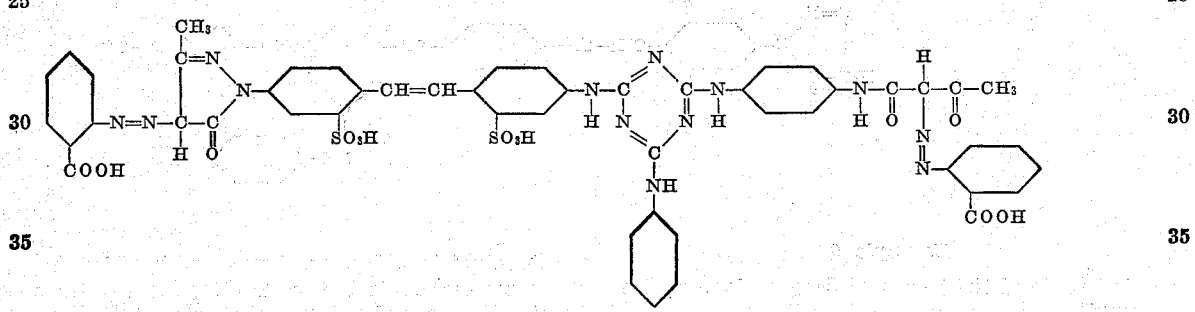

Example 10

42.9 parts of the ternary condensation product of the first paragraph of Example 9 are dissolved to a neutral solution which is mixed with a diazo solution from 6.9 parts of 1-aminobenzene-2-carboxylic acid to which sodium acetate has been added. The whole is stirred until the diazo compound has disappeared and is then rendered alkaline and mixed with diazo compound from 9.4 parts of 1-hydroxy-2-aminobenzene-4-sulfonic acid. After this diazo compound has also disappeared, the whole is filtered and the filtered dyestuff is suspended in 1000 parts of water. 20 parts of copper acetate are added and the suspension is heated for some time at 80° C., after which the copper compound tion product in different orders of succession with 1 mol of a diazotized 1-aminobenzene-2-carboxylic acid, 1 mol of an ortho-hydroxy-diazo compound, for example, 1-hydroxy-2-amino-4-nitrobenzene or with 1 mol of a diazotized amino-azo-dyestuff, for example with the diazotized azo-dyestuff from 1 mol of diazotized 1-aminonaphthalene-3:6-disulfonic acid and 1 mol of meta-toluidine.

Quite similar metalliferous dyestuffs are also obtained if in the preparation of the condensation product serving as coupling component the 18.4 parts of cyanuric chloride are replaced by 15 parts of 2:6-dichloro-4-methylpyrimidine, 19.9 parts of dichloro-quinazoline or 21.4 parts of phenyldichlorotriazine.

The formulae of the unmetallized dyestuffs may, for example, be:

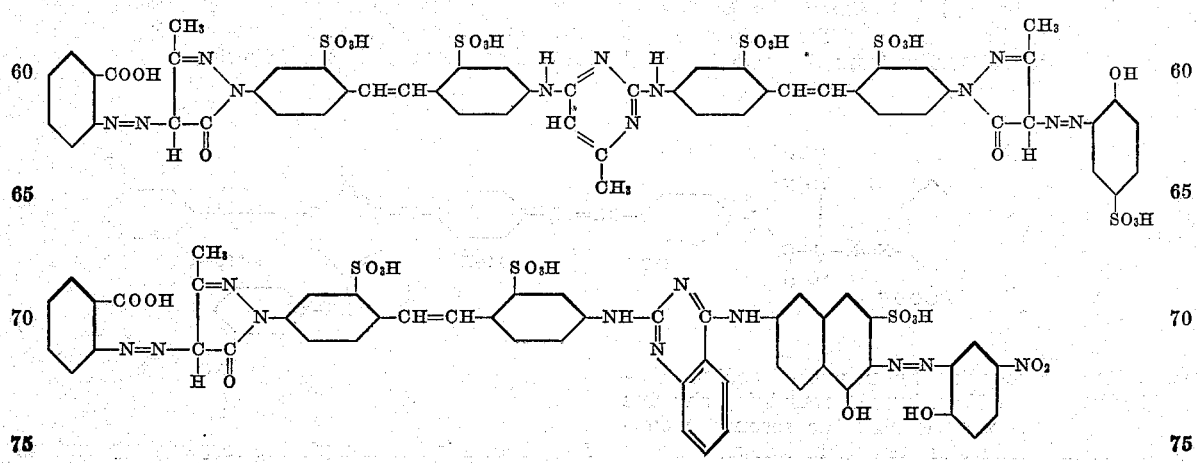

What I claim is:

1. The metal compounds of the azo-dyestuffs corresponding in the free state to the general formula

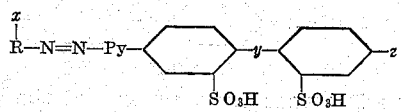

in which R stands for a nucleus of the group consisting of aromatic nuclei of the benzene and naphthalene series, $x$ stands for a lake-forming group in ortho position to the —N=N-group, Py stands for the radical of a 5-pyrazolone which is combined in 1-position with the radical

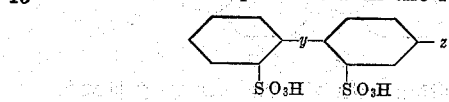

and in 4-position with the azo-group, $y$ stands for a connecting link of the group consisting of —CH=CH— and —CH$_2$—CH$_2$—, and $z$ stands for the radical of an azo-dyestuff of the general formula R$_1$—N=N—R$_2$ wherein the symbols R$_1$ and R$_2$ represent aromatic nuclei selected from the group consisting of aromatic nuclei of the benzene and naphthalene series, one of the nuclei R$_1$ and R$_2$ being linked to the radical

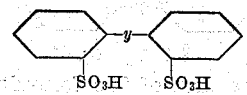

by a connecting link of the general formula

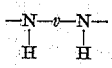

$v$ standing for a member of the group consisting of C=O and the radical of a heterocyclic six-membered ring system whose heterocyclic six-membered ring consists of carbon and nitrogen atoms of which at least 3 and at the most 4 are carbon atoms and at least 2 and at the most 3 are nitrogen atoms, the

groups being linked to the carbon atom of the

groupings of the heterocyclic ring, which products form yellow to brown powders, dissolve in water to yellow to orange, brown and olive solutions, and dye cotton fast yellow to orange, brown and olive tints which are particularly fast to light.

2. The metal compounds of the azo dyestuffs corresponding in the free state to the general formula

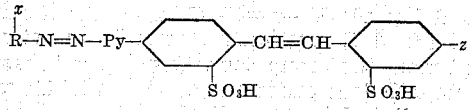

in which R stands for a nucleus of the group consisting of aromatic nuclei of the benzene and naphthalene series, $x$ stands for a lake-forming group in ortho position to the —N=N-group, Py stands for the radical of a 5-pyrazolone which is combined in 4-position with the azo group and in 1-position with the radical

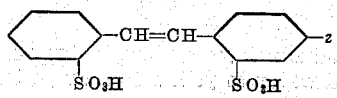

and $z$ stands for the radical of an azo dyestuff R$_1$—N=N—R$_2$ wherein the symbols R$_1$ and R$_2$ represent aromatic nuclei selected from the group consisting of the benzene and naphthalene series, one of the two aromatic nuclei R$_1$ and R$_2$ being linked to the radical

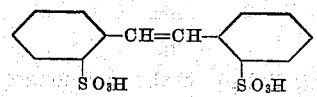

by a connecting link of the general formula

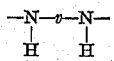

$v$ standing for a member of the group consisting of

and the radical of a heterocyclic six-membered ring system, whose heterocyclic six-membered ring consists of carbon and nitrogen of which at least 3 and at the most 4 are carbon atoms and at least 2 and at the most 3 are nitrogen atoms, the

groups being linked to the carbon atom of the

groupings of the heterocyclic ring, which products form yellow to brown powders, dissolve in water to yellow to orange, brown and olive solutions and dye cotton fast yellow to orange, brown and olive tints which are particularly fast to light.

3. The copper compounds of the azo-dyestuffs corresponding in the free state to the general formula

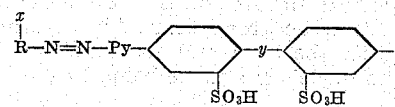

in which R stands for a nucleus of the group consisting of aromatic nuclei of the benzene and naphthalene series, $x$ stands for lake-forming group in ortho position to the —N=N-group, Py stands for the radical of a 5-pyrazolone which is combined in 1-position with the radical

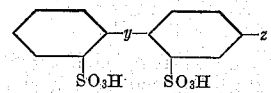

and in 4-position with the azo-group, $y$ stands for a connecting link of the group consisting of —CH=CH— and —CH$_2$—CH$_2$—, and $z$ stands for the radical of an azo-dyestuff of the general formula R$_1$—N=N—R$_2$ wherein the symbols R$_1$ and R$_2$ represent aromatic nuclei selected from the group consisting of aromatic nuclei of the benzene and naphthalene series, one of the nuclei R$_1$ and R$_2$ being linked to the radical

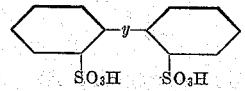

by a connecting link of the general formula

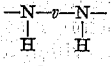

$v$ standing for a member of the group consisting of C=O and the radical of a heterocyclic six-membered ring system whose heterocyclic six-membered ring consists of carbon and nitrogen atoms of which at least 3 and at the most 4 are carbon atoms and at least 2 and at the most 3 are nitrogen atoms, the

groups being linked to the carbon atom of the

groupings of the heterocyclic ring, which products form yellow to brown powders, dissolve in water to yellow to orange, brown and olive solutions, and dye cotton fast yellow to orange, brown and olive tints which are particularly fast to light.

4. The copper compounds of the azo dyestuffs corresponding in the free state to the general formula

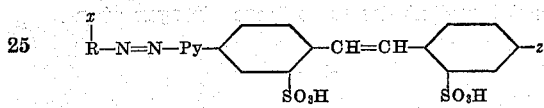

in which R stands for a nucleus of the group consisting of aromatic nuclei of the benzene and naphthalene series, $x$ stands for lake-forming group in ortho position to the —N=N-group, Py stands for the radical of a 5-pyrazolone which is combined in 4-position with the azo group and in 1-position with the radical

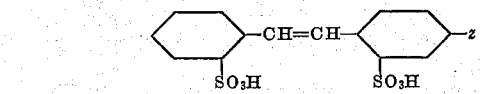

and $z$ stands for the radical of an azo dyestuff of the general formula $R_1$—N=N—$R_2$, wherein the symbols $R_1$ and $R_2$ represent aromatic nuclei selected from the group consisting of aromatic nuclei of the benzene and naphthalene series, one of the nuclei $R_1$ and $R_2$ being linked to the radical

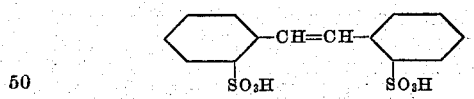

by a connecting link of the general formula

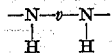

$v$ standing for a member of the group consisting of C=O and the radical of a heterocyclic six-membered ring system whose heterocyclic six-membered ring consists of carbon and nitrogen atoms of which at least 3 and at the most 4 are carbon atoms and at least 2 and at the most 3 are nitrogen atoms, the

groups being linked to the carbon atom of the

groupings of the heterocyclic ring, which products form yellow to brown powders, dissolve in water to yellow to orange, brown and olive solutions, and dye cotton fast yellow to orange, brown and olive tints which are particularly fast to light.

5. The copper compounds of the azo-dyestuffs corresponding in the free state to the general formula

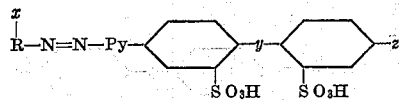

in which R stands for a nucleus of the group consisting of aromatic nuclei of the benzene and naphthalene series, $x$ stands for a lake-forming group in ortho-position to the —N=N-group, Py stands for the radical of a 5-pyrazolone which is combined in 1-position with the radical

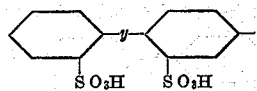

and in 4-position with the azo-group, $y$ stands for a connecting link of the group consisting of —CH=CH— and —CH$_2$—CH$_2$—, and $z$ stands for the radical of an azo-dyestuff of the general formula $R_1$—N=N—$R_2$, wherein the symbols $R_1$ and $R_2$ represent aromatic nuclei selected from the group consisting of aromatic nuclei of the benzene and naphthalene series, one of the nuclei $R_1$ and $R_2$ being linked to the radical

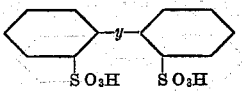

by a connecting link of the formula

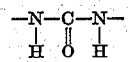

which products form yellow to brown powders, dissolve in water to yellow to orange, brown and olive solutions, and dye cotton fast yellow to orange, brown and olive tints which are particularly fast to light.

6. The copper compounds of the azo dyestuffs corresponding in the free state to the general formula

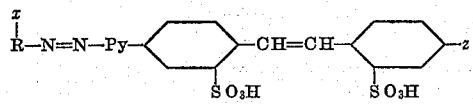

in which R stands for a nucleus of the group consisting of aromatic nuclei of the benzene and naphthalene series, $x$ stands for a lake-forming group in ortho-position to the —N=N— group, Py stands for the radical of a 5-pyrazolone which is combined in 1-position with the radical

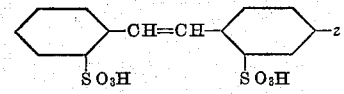

and in 4-position with the azo group, and $z$ stands for the radical of an azo dyestuff of the general formula $R_1$—N=N—$R_2$ wherein the symbols $R_1$ and $R_2$ represent aromatic nuclei selected from the group consisting of the benzene and naphthalene series one of the nuclei $R_1$ and $R_2$ being linked to the radical

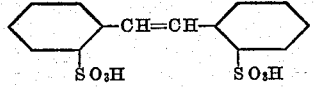

by a connecting link of the formula

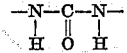

which products form yellow to brown powders, dissolve in water to yellow to orange, brown and olive solutions, and dye cotton fast yellow to orange, brown and olive tints which are particularly fast to light.

7. The metal compounds of the azo-dyestuffs having in the free state the formula

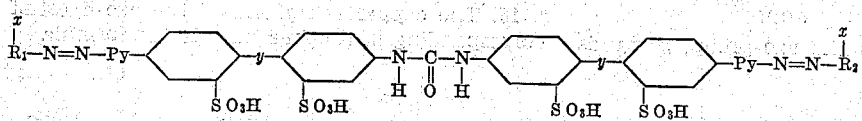

in which $R_1$ and $R_2$ stand for nuclei of the benzene series, $x$ stands for a lake-forming group in ortho-position to the —N=N— group, $y$ stands for a connecting link of the group consisting of —CH=CH— and —CH$_2$—CH$_2$—, and Py stands for the radical of a 5-pyrazolone which is linked in 1-position to the radical

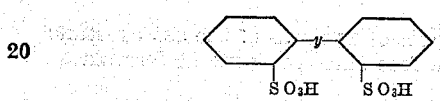

and in 4-position to the azo-group, which products form yellow to brown powders, dissolve in water to yellow to orange and brown solutions and dye cotton similar tints fast to light.

8. The copper compounds of the azo-dyestuffs having in the free state the formula

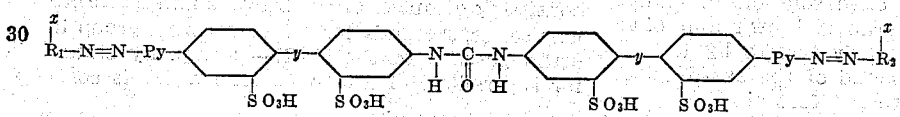

in which $R_1$ and $R_2$ stand for nuclei of the benzene series, $x$ stands for a lake-forming group in ortho-position to the —N=N— group, $y$ stands for a connecting link of the group consisting of —CH=CH— and —CH$_2$—CH$_2$—, and Py stands for the radical of a 5-pyrazolone which is linked in 1-position to the radical

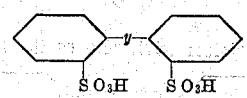

and in 4-position to the azo-group, which products form yellow to brown powders, dissolve in water to yellow to orange and brown solutions and dye cotton similar tints fast to light.

9. The copper compounds of the azo dyestuffs corresponding in the free state to the general formula

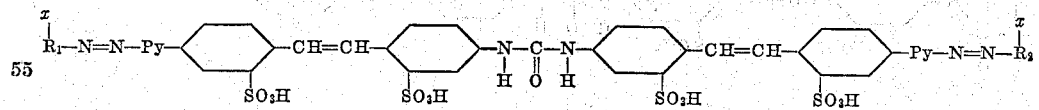

in which $R_1$ and $R_2$ stand for nuclei of the benzene series, $x$ stands for a lake-forming group in ortho position to the —N=N— group and Py stands for the radical of a 5-pyrazolone which is linked in 1-position to the radical

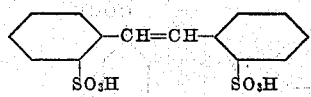

and in 4-position to the azo group, which products form yellow to brown powders, dissolve in water to yellow to orange and brown solutions and dye cotton similar tints fast to light.

10. The metal compounds of the azo-dyestuffs having in the free state the general formula

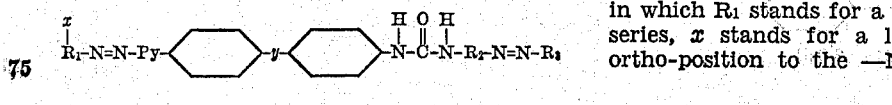

in which $R_1$ stands for a nucleus of the group consisting of nuclei of the benzene and naphthalene series, $x$ stands for a lake-forming group in ortho-position to the —N=N— group, Py stands for the radical of a 5-pyrazolone which is combined in 1-position with the radical

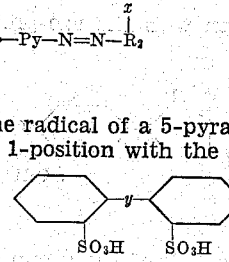

and in 4-position with the azo-group, $y$ stands for a connecting link of the group consisting of —CH=CH— and —CH$_2$—CH$_2$—, and $R_2$ and $R_3$ stand for nuclei selected from the group consisting of aromatic nuclei of the benzene and naphthalene series, which products form yellow to brown powders, dissolve in water to yellow to orange, brown and olive solutions, and dye cotton fast yellow to orange, brown and olive tints which are particularly fast to light.

11. The copper compounds of the azo-dyestuffs having in the free state the general formula

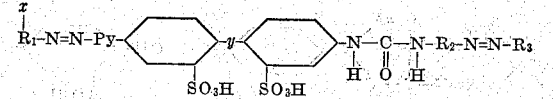

in which $R_1$ stands for a nucleus of the group consisting of nuclei of the benzene and naphthalene series, $x$ stands for a lake-forming group in ortho-position to the —N=N— group, Py stands for the radical of a 5-pyrazolone which is combined in 1-position with the radical

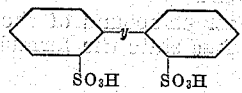

and in 4-position to the azo-group, $y$ stands for a connecting link of the group consisting of —CH=CH— and CH$_2$—CH$_2$—, and $R_2$ and $R_3$ stand for nuclei selected from the group consisting of aromatic nuclei of the benzene and naphthalene series, which products form yellow to brown powders, dissolve in water to yellow to orange, brown and olive solutions, and dye cotton fast yellow to orange, brown and olive tints which are particularly fast to light.

12. The copper compounds of the azo-dyestuffs having in the free state the general formula

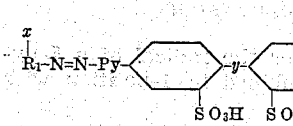

in which $R_1$ stands for a nucleus of the benzene series, $x$ stands for a lake-forming group in ortho-position to the —N=N-group, Py stands for the radical of a 5-pyrazolone which is combined in 1-position with the radical

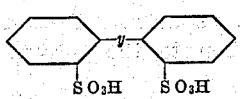

and in 4-position with the azo-group, $y$ stands for a connecting link of the group consisting of —CH=CH— and —CH$_2$—CH$_2$—, and R$_2$ and R$_3$ stand for nuclei selected from the group consisting of aromatic nuclei of the benzene and naphthalene series, which products form yellow to brown products, dissolve in water to yellow to orange, brown and olive solutions, and dye cotton fast yellow to orange, brown and olive tints, which are particularly fast to light.

13. The copper compound of the azo-dyestuff having in the free state the formula

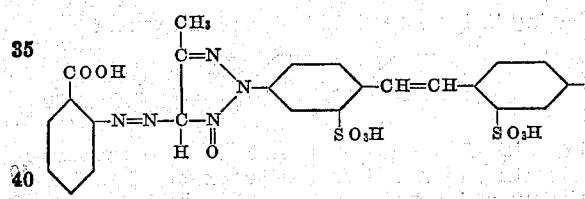

which yields on the vegetable fiber yellow-brown tints fast to light.

14. The copper compound of the azo-dyestuff having in the free state the formula

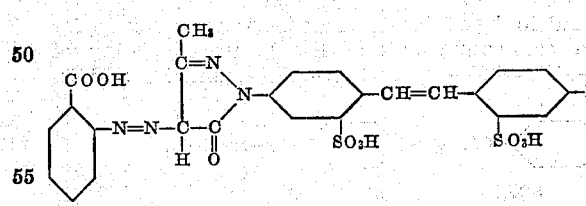

which yields on the vegetable fiber yellow tints fast to light.

15. The copper compounds of the azo-dyestuffs corresponding in the free state to the general formula

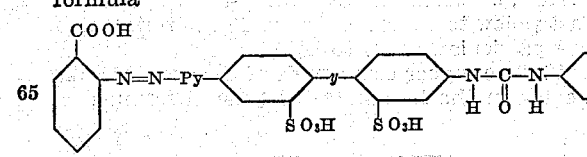

in which Py stands for the radical of a 5-pyrazolone which is combined in 1-position with the radical and in 4-position with the azo-group, and $y$ stands for a connecting link of the group consisting of —CH=CH— and —CH$_2$—CH$_2$—, which products yield yellow tints on the vegetable fiber which are fast to light.

16. The copper compound of the azo-dyestuff corresponding in the free state to the formula

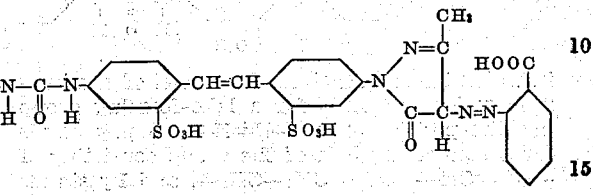

which yields on the vegetable fiber yellow tints fast to light.

17. The copper compounds of the azo dyestuffs having in the free state the general formula

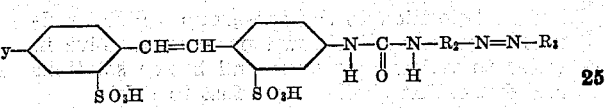

in which R$_1$ stands for a nucleus of the group consisting of nuclei of the benzene and naphthalene series, $x$ stands for a lake-forming group in ortho position to the N=N— group, Py stands for the radical of a 5-pyrazolone which is combined in 1-position with the radical

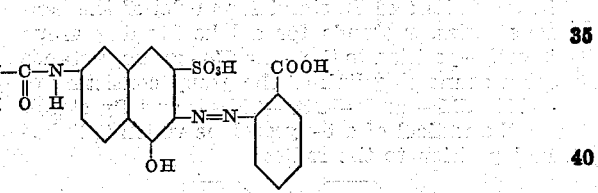

and in 4-position with the azo group and R$_2$ and R$_3$ stand for nuclei selected from the group consisting of the benzene and naphthalene series, which products form yellow to brown powders, dissolve in water to yellow to orange, brown and olive solutions, and dye cotton fast yellow to orange, brown and olive tints which are particularly fast to light.

MAX SCHMID.